United States Patent Office 3,106,573
Patented Oct. 8, 1963

3,106,573
ESTERS OF DIBORONIC ACIDS
William Randall Bamford, West Kilbride, Scotland, assignor to Imperial Chemical Industries Limited, Millbank, London, England, a corporation of Great Britain
No Drawing. Filed Aug. 23, 1961, Ser. No. 132,590
Claims priority, application Great Britain Sept. 1, 1960
16 Claims. (Cl. 260—462)

This invention relates to new and useful compounds and more particularly to new and useful compounds derived from diboronic acids.

Various acidic compounds containing boron are known and have been prepared. Included among these are the diboronic acids, examples of which include the p-phenylene diboronic acids and the polymethylene diboronic acids in which the two boron atoms are separated by a polymethylene chain having from 4 to 10 carbon atoms. We have now found that a new and useful class of compounds can be prepared by reaction of certain of the diboronic acids with certain trihydroxy compounds.

According to the present invention we provide a new and useful class of compounds having the general formula

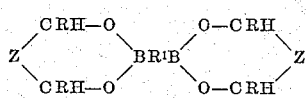

where R is a hydrogen atom, a methyl group or an ethyl group, $R^1$ is a polymethylene group having from 4 to 10 inclusive carbon atoms, a p-phenylene group or an alkyl-substituted p-phenylene group and Z is selected from divalent groups having one of the general formulae

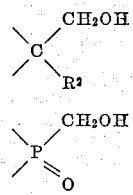

and

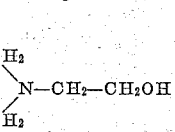

when R is a hydrogen atom and is

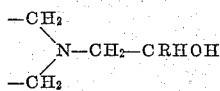

when R is a methyl or ethyl group, $R^2$ being an alkyl or aryl group or an alkyl or aryl group having a halogen or an alkoxy substituent.

The group $R^2$ may be selected from a wide variety of alkyl and aryl groups and substituted alkyl and aryl groups. Among such groups may be included, for example methyl, ethyl, methoxymethyl, allyloxymethyl, 1-ethoxyethyl and chloromethyl groups.

The compounds of our invention may be prepared by several methods. In one method, for example the diboronic acid is heated under reflux conditions with a suitable trihydroxy compound in a hydrocarbon solvent. The water formed is removed by azeotropic distillation and the product finally recovered by removal of the solvent. In another method, an ester, for example the tetrabutyl ester of a diboronic acid is heated with the trihydroxy compound and the butanol eliminated removed by distillation. In a further method the acid and trihydroxy compound are heated in presence of an alcohol such as ethanol and the product then crystallised from the solution, after concentration if necessary. The proportions of the reactants should be such that there are at least two mols of trihydroxy compound present for every mol of acid. The use of any lesser proportions of trihydroxy compound will not give the desired product but will result in the formation of undesired products such as polymeric esters.

Suitable diboronic acids which may be used in preparing the compounds of our invention include p-phenylene diboronic acid and the polymethylene diboronic acids where the polymethylene group has from 4 to 10 carbon atoms such as, for example tetramethylene diboronic acid, pentamethylene diboronic acid, hexamethylene diboronic acid, decamethylene diboronic acid, and the like. The preparation of polymethylene diboronic acids is described in U.K. Patent No. 864,473.

A wide variety of trihydroxy compounds may be used in making the new compounds of our invention. In the case of those not based on a nitrogen atom it is of course essential that the hydroxyl groups should be in a chain such that the position of each relative to the other two is 1:3 and in the case of the nitrogen compounds 1:5. Suitable compounds which may be used include, for example 1:1:1-trimethylolethane, 1:1:1-trimethylolpropane, (methoxymethyl)trimethylolmethane, (allyloxymethyl)trimethylolmethane, (1-ethoxyethyl)trimethylolmethane, 1:1:1 - trimethylol-2 - chloroethane, tris(hydroxymethyl) phosphine oxide, triethanolamine, tri-2-propanolamine, and the like. The compounds trimethylolethane, trimethylolpropane and triethanolamine are, however, preferred.

The compounds of our invention are useful intermediates, for example for the preparation of polymers such as polyesters, polyurethanes, polyureas and the like. They are also useful in compositions used as neutron absorbers, flame resisters, plasticisers and as the active ingredients in insecticides, bactericides, germicides, fungicides and pesticides.

Our invention is further illustrated by the following examples in which all parts are by weight.

*Example 1*

26.8 parts of 1:1:1-trimethylolpropane, 16.6 parts of p-phenylenediboronic acid and 400 parts of xylene were heated together under reflux using a water entrainer (Dean and Stark type) for a period of two to three hours after which no more water was liberated. On cooling the reaction mixture an off-white solid crystallised out. This solid was recrystallised from xylene, washed with hexane and dried to give 32.6 parts of a product having a melting point of 202-3° C. Analysis showed this material to contain 6.0 percent of boron which was reasonably in accordance with the theoretical boron content of bis(1:1:1-trimethylolpropane)p-phenylenediboronate which is 5.95 percent.

When this product was heated with an equimolecular proportion of a di-isocyanate such as 4,4'-di-isocyanatodiphenylmethane or 2,4-di-isocyanatotoluene in xylene under reflux conditions, fibre-forming resins were obtained which had good adhesive properties and formed hard surface-coatings.

*Example 2*

149 parts of triethanolamine in 800 parts of ethanol were added to 73 parts of tetramethylenediboronic acid in 400 parts ethanol and the mixture heated to boil off 600 parts of the solvent. On cooling the solution there was obtained 169 parts of a crystalline solid having a melting point of 210 to 212° C. Analysis showed this product to contain 5.6 percent boron, 51.2 percent carbon and 6.8 percent nitrogen. These were in reasonable agreement with the theoretical requirements of bis(triethanolamine)tetramethylenediboronate which are 5.81 percent boron, 51.64 percent carbon and 7.52 percent nitrogen.

Polymeric resins were obtained when this material was heated with a di-isocyanate or dimethyl terephthalate in the presence of zinc acetate and antimony trioxide.

*Example 3*

59 parts of triethanolamine and 78 parts of tetrabutyl p-phenylenediboronate were mixed together and heated to remove butanol by distillation. There was obtained 64 parts of a white powder having a melting point of 244–245° C. Analysis showed this product to contain 7.4 percent nitrogen, 5.6 percent boron and 54.5 percent carbon. These were in accordance with the theoretical requirements of bis(triethanolamine)p-phenylenediboronate which are 7.14 percent nitrogen, 5.51 percent boron and 55.13 percent carbon.

*Example 4*

134 parts of 1:1:1-trimethylolpropane and 195 parts of tetrabutyl p-phenylenediboronate were heated together and the eliminated butanol removed by distillation. The residue was recrystallised from acetone and gave 112 parts of bis(1:1:1-trimethylolpropane)p-phenylenediboronate of properties identical with the product of Example 1.

*Example 5*

240 parts of 1:1:1-trimethylolethane and 166 parts of p-phenylenediboronic acid were heated together in the manner described in Example 1. There was obtained 296 parts of a crystalline solid having a melting point of 195 to 198° C. Analysis showed this product to contain 6.3 percent boron which is in accord with the theoretical boron content of 6.48 percent for bis(1:1:1-trimethylolethane)p-phenylenediboronate.

*Example 6*

89 parts of triethanolamine and 43 parts of tetramethylenediboronic acid were heated with 400 parts of dry benzene in an apparatus of the kind used in Example 1 until water ceased to be liberated. The reaction mixture was then evaporated to dryness and the residues recrystallised from a mixture of alcohol and acetone to give 87 parts of bis(triethanolamine) tetramethylenediboronate of properties identical with the product of Example 2.

*Example 7*

73 parts of tetramethylenediboronic acid in 400 parts of absolute ethanol were added to 191 parts tri-2-propanolamine in 800 parts absolute ethanol. The product which separated on concentrating the solution by distillation at atmospheric pressure was recrystallised from ethanol to give 164 parts of a colourless solid, having a melting point of 203–205° C. Analysis showed this material to contain 4.4 percent of boron, the theoretical requirement of boron being 4.74 percent for the compound bis(tri-2-propanolamine) tetramethylenediboronate.

*Example 8*

140 parts of tris(hydroxymethyl)phosphine oxide and 83 parts p-phenylenediboronic acid in 4,000 parts xylene were heated together in the manner described in Example 1. The product was finally dried by heating at 100° C. for 4 hours under vacuum to give 182 parts of an off-white solid which had no definite melting point. Analysis showed that this product contained 5.7 percent boron which is in accordance with the theoretical boron content of 5.84 percent for the compound bis(tris(hydroxymethyl)phosphineoxide)p-phenylenediboronate.

When an aqueous suspension of this product was heated with urea, a brittle thermosetting resin was obtained.

*Example 9*

30.9 parts of 1:1:1-trimethylol-2-chloroethane, 16.6 parts of p-phenylenediboronic acid and 400 parts of xylene were caused to react in the manner described in Example 1 to give 22.6 parts of a white crystalline solid having a melting point of 218 to 222° C. Analysis showed this material to contain 5.8 percent boron, the theoretical requirement of boron for the compound bis(1:1:1-trimethylol - 2 - chloroethane)p-phenylenediboronate being 5.37 percent.

*Example 10*

The procedure of Example 1 was repeated using 35.2 parts of allyloxymethyltrimethylolmethane instead of the 1:1:1-trimethylolpropane. The product was a white crystalline solid having a melting point of 109 to 112° C. Analysis showed this product to contain 59.4 percent carbon, 7.6 percent hydrogen and 5.0 percent boron. These were in accordance with the theoretical requirements of bis(allyloxymethyltrimethylolmethane)p - phenylenediboronate which are 59.23 percent carbon, 7.23 percent hydrogen and 4.85 percent boron.

*Example 11*

36 parts of tetrabutyl decamethylenediboronate were added to 23.6 parts of triethanolamine and the mixture at once became warm. The mixture was allowed to stand overnight and was subsequently heated under vacuum to remove butanol. 80 parts acetone were added to the residue, and the mixture was allowed to stand overnight at 5° C. 29.9 parts of a white crystalline solid having a melting point of 122 to 125° C. were then filtered from the mixture. Analysis showed this product to contain 6.2 percent nitrogen, the theoretical requirement for the compound bis(triethanolamine) decamethylenediboronate being 6.14 percent of nitrogen.

What I claim is:

1. The class of compounds having the general formula

wherein R is selected from the group consisting of a hydrogen atom, methyl, and ethyl, R¹ is selected from the group consisting of polymethylene having from 4 to 10 carbon atoms, p-phenylene, and alkyl substituted p-phenylene and Z is selected from divalent groups having one of the formulae

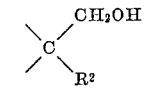

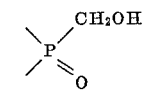

and

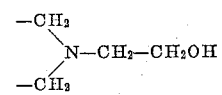

when R is a hydrogen atom and is

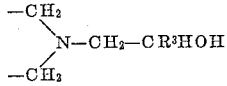

when R is selected from the group consisting of methyl and ethyl, R² being selected from the group consisting of alkyl, aryl, halogenoalkyl, halogenoaryl, alkoxyalkyl, alkoxyaryl, and allyloxymethyl, and R³ being methyl when R is methyl and ethyl when R is ethyl.

2. Compounds of the class claimed in claim 1 in which R¹ is a tetramethylene group.

3. Compounds of the class claimed in claim 1 in which R¹ is a decamethylene group.

4. Compounds as claimed in claim 1 in which R² is a methyl group.

5. Compounds as claimed in claim 1 in which $R^2$ is an ethyl group.
6. Compounds as claimed in claim 1 in which $R^2$ is an allyloxymethyl group.
7. Compounds as claimed in claim 1 in which $R^2$ is a chloromethyl group.
8. Bis(1:1:1-trimethylolpropane)p-phenylenediboronate.
9. Bis(triethanolamine)tetramethylenediboronate.
10. Bis(triethanolamine)p-phenylenediboronate.
11. Bis(1:1:1-trimethylolethane)p-phenylenediboronate.
12. Bis(tri-2-propanolamine)tetramethylenediboronate.
13. Bis(tris(hydroxymethyl)phosphine oxide)p-phenylenediboronate.
14. Bis(1:1:1-trimethylol-2-chloroethane)p - phenylene diboronate.
15. Bis(allyloxymethyltrimethylolmethane)p-phenylene diboronate.
16. Bis(triethanolamine)decamethylenediboronate.

References Cited in the file of this patent

UNITED STATES PATENTS 2,939,877    Washburn _____ June 7, 1960